(12) United States Patent
Adams et al.

(10) Patent No.: US 11,027,347 B2
(45) Date of Patent: **\*Jun. 8, 2021**

(54) RECIPROCATING SAW

(71) Applicant: MILWAUKEE ELECTRIC TOOL CORPORATION, Brookfield, WI (US)

(72) Inventors: Joshua Adams, Milwaukee, WI (US); Ryan J. Denissen, Sussex, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 24 days.

This patent is subject to a terminal disclaimer.

(21) Appl. No.: 16/188,382

(22) Filed: Nov. 13, 2018

(65) Prior Publication Data

US 2019/0076941 A1   Mar. 14, 2019

Related U.S. Application Data

(63) Continuation of application No. 14/297,814, filed on Jun. 6, 2014, now Pat. No. 10,124,430.

(60) Provisional application No. 61/831,945, filed on Jun. 6, 2013.

(51) Int. Cl.
   *B23D 51/00* (2006.01)
   *B25F 5/02* (2006.01)

(52) U.S. Cl.
   CPC .............. *B23D 51/00* (2013.01); *B25F 5/02* (2013.01)

(58) Field of Classification Search
   CPC .................. B23D 49/14; B23D 49/16; B23D 49/162–167; B23D 51/10; B23D 51/16; B25F 5/02

USPC .................................................... 30/392–394
See application file for complete search history.

(56) References Cited

U.S. PATENT DOCUMENTS

| | | | |
|---|---|---|---|
| 2,548,411 A | 4/1951 | Vache | |
| 3,033,252 A | 5/1962 | Atkinson | |
| 3,596,525 A | 8/1971 | Niesz | |
| 3,722,496 A | 3/1973 | Schuman | |
| 4,352,241 A | 10/1982 | Johansson | |
| 4,580,460 A | 4/1986 | Chang et al. | |
| 4,979,306 A | 12/1990 | Koga et al. | |
| 5,006,740 A * | 4/1991 | Palm | B23Q 11/005 310/43 |
| 5,007,172 A | 4/1991 | Palm | |
| 5,542,183 A | 8/1996 | Allison | |
| 6,155,149 A | 12/2000 | Colson | |

(Continued)

FOREIGN PATENT DOCUMENTS

| | | |
|---|---|---|
| EP | 0036516 | 9/1981 |
| EP | 1427574 | 2/2006 |

(Continued)

*Primary Examiner* — Laura M Lee
(74) *Attorney, Agent, or Firm* — Michael Best & Friedrich LLP

(57) ABSTRACT

A reciprocating saw includes an outer housing defining a longitudinal axis, a casing positioned within the outer housing, an upstream opening between the outer housing and the casing, a downstream opening, and an egress path extending between the upstream opening and the downstream opening. The egress path includes an upstream portion that extends along the longitudinal axis, a downstream portion that extends in a direction transverse to the longitudinal axis, and a redirecting surface positioned between the upstream portion and the downstream portion.

17 Claims, 6 Drawing Sheets

(56) References Cited

U.S. PATENT DOCUMENTS

| | | | |
|---|---|---|---|
| 6,226,877 B1 | 5/2001 | Ono | |
| 6,523,267 B1 | 2/2003 | Osada et al. | |
| 6,810,589 B2 | 11/2004 | Lagaly et al. | |
| 7,089,670 B2 | 4/2006 | Donnerdal | |
| 7,261,624 B2 | 8/2007 | Wedel et al. | |
| 7,424,779 B2 | 9/2008 | Tozawa et al. | |
| 7,913,395 B1 | 3/2011 | Nigh | |
| 10,124,430 B2 * | 11/2018 | Adams | B25F 5/02 |
| 2007/0084066 A1 | 4/2007 | Hastie | |
| 2010/0147278 A1 | 6/2010 | Tadokoro et al. | |
| 2012/0297632 A1 | 11/2012 | Ogura | |
| 2014/0360029 A1 * | 12/2014 | Adams | B25F 5/02 |
| | | | 30/392 |
| 2019/0076941 A1 * | 3/2019 | Adams | B25F 5/02 |

FOREIGN PATENT DOCUMENTS

| | | |
|---|---|---|
| WO | 2003/041921 | 5/2003 |
| WO | 2009/035153 | 3/2009 |

* cited by examiner

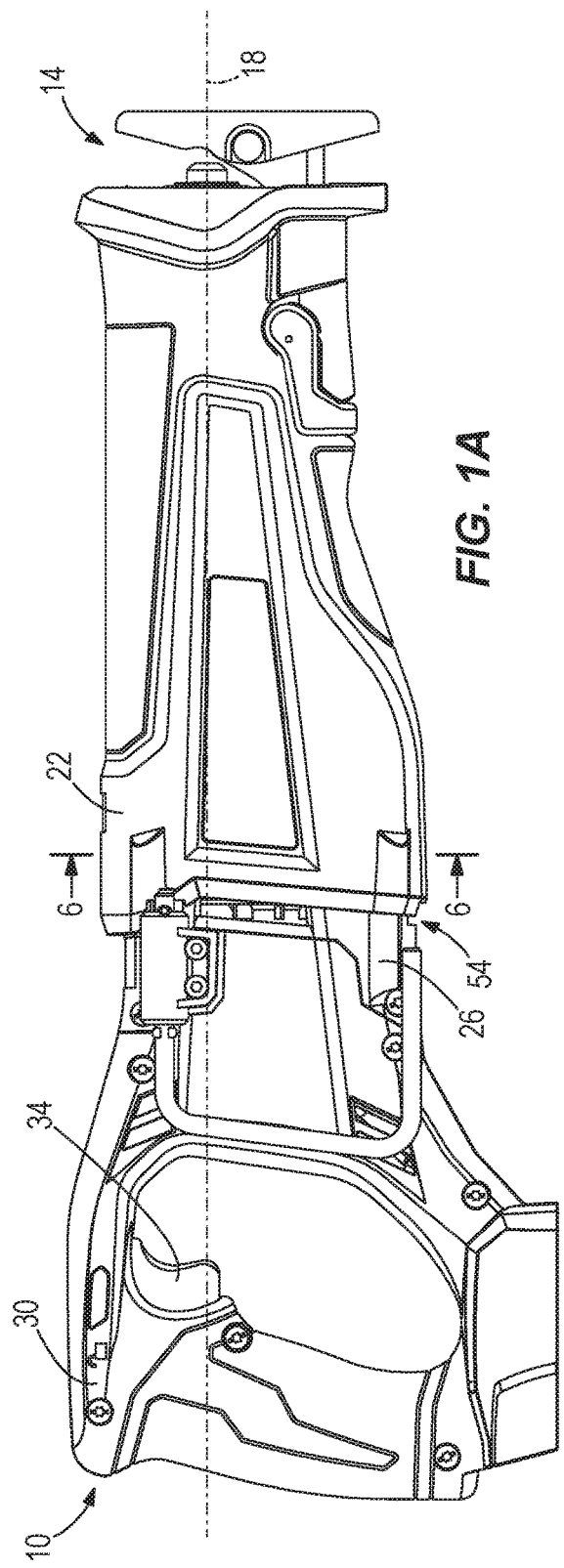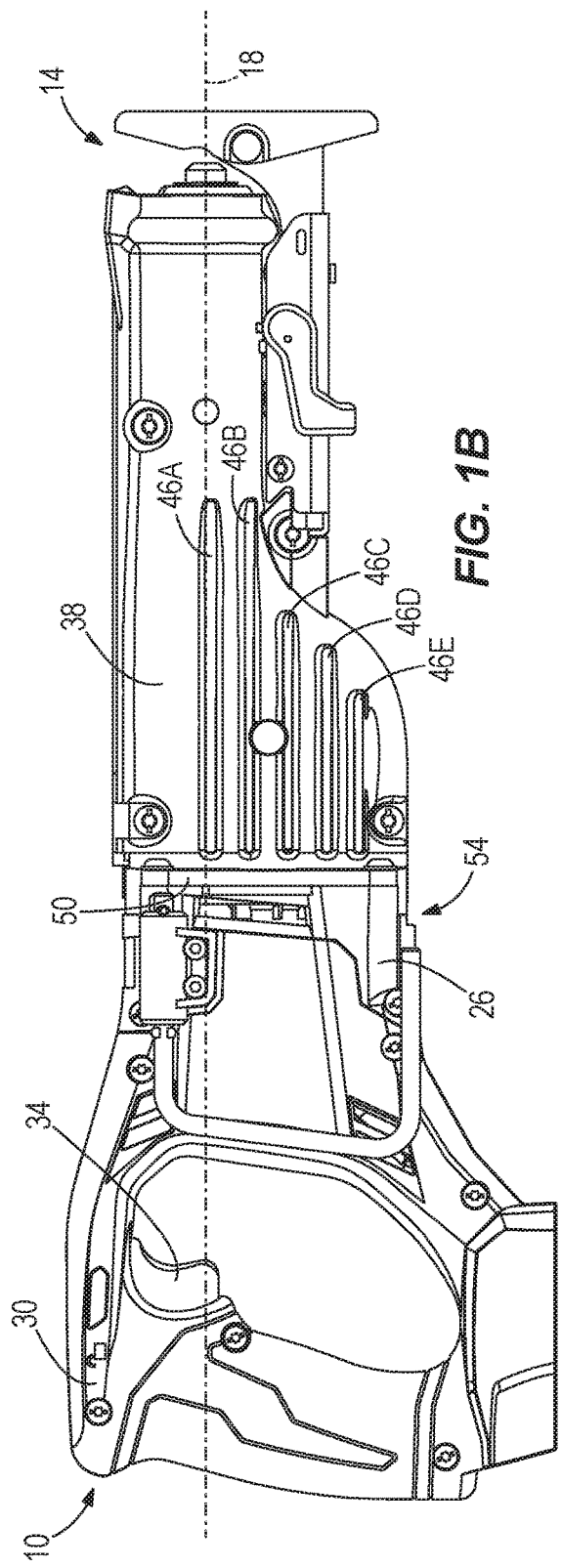

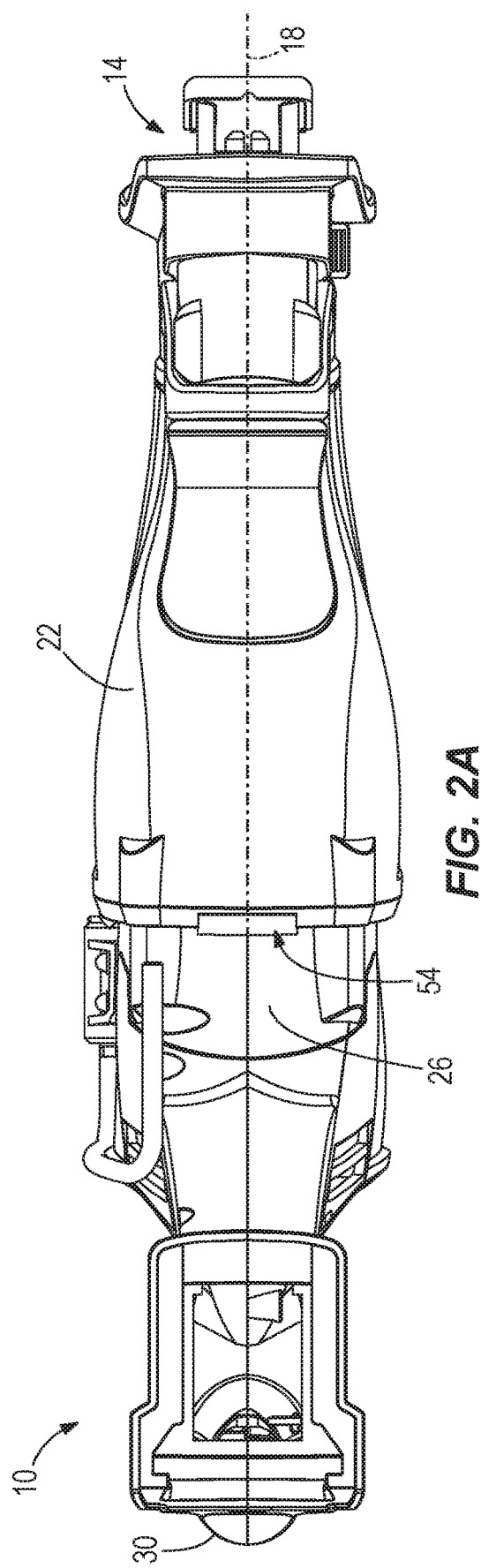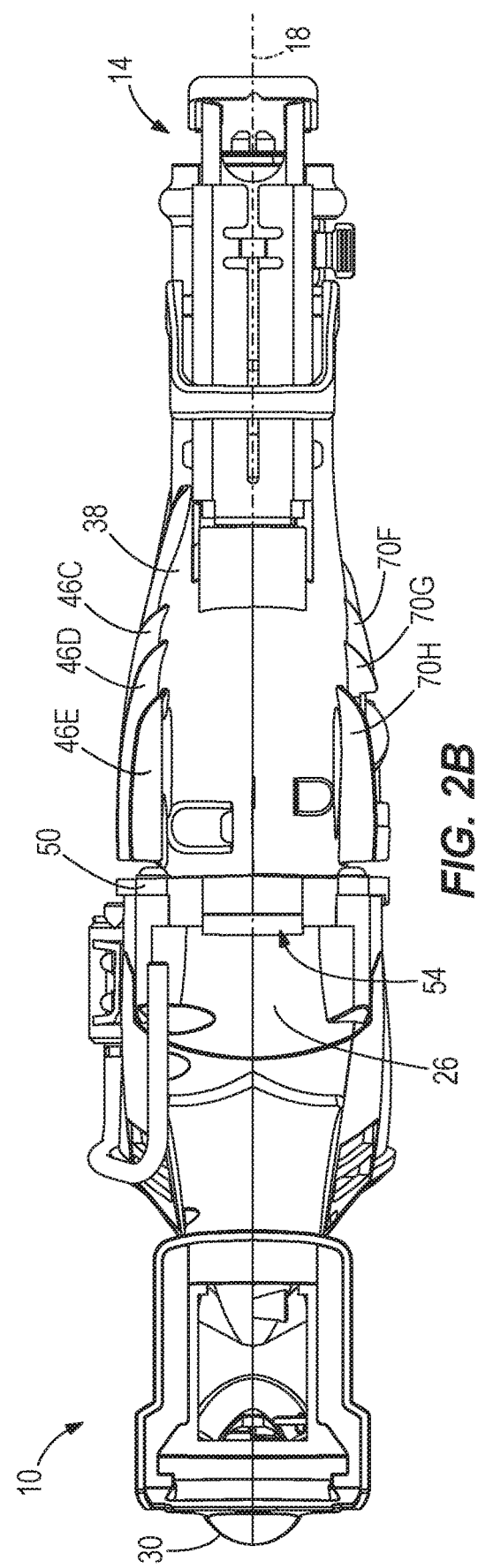

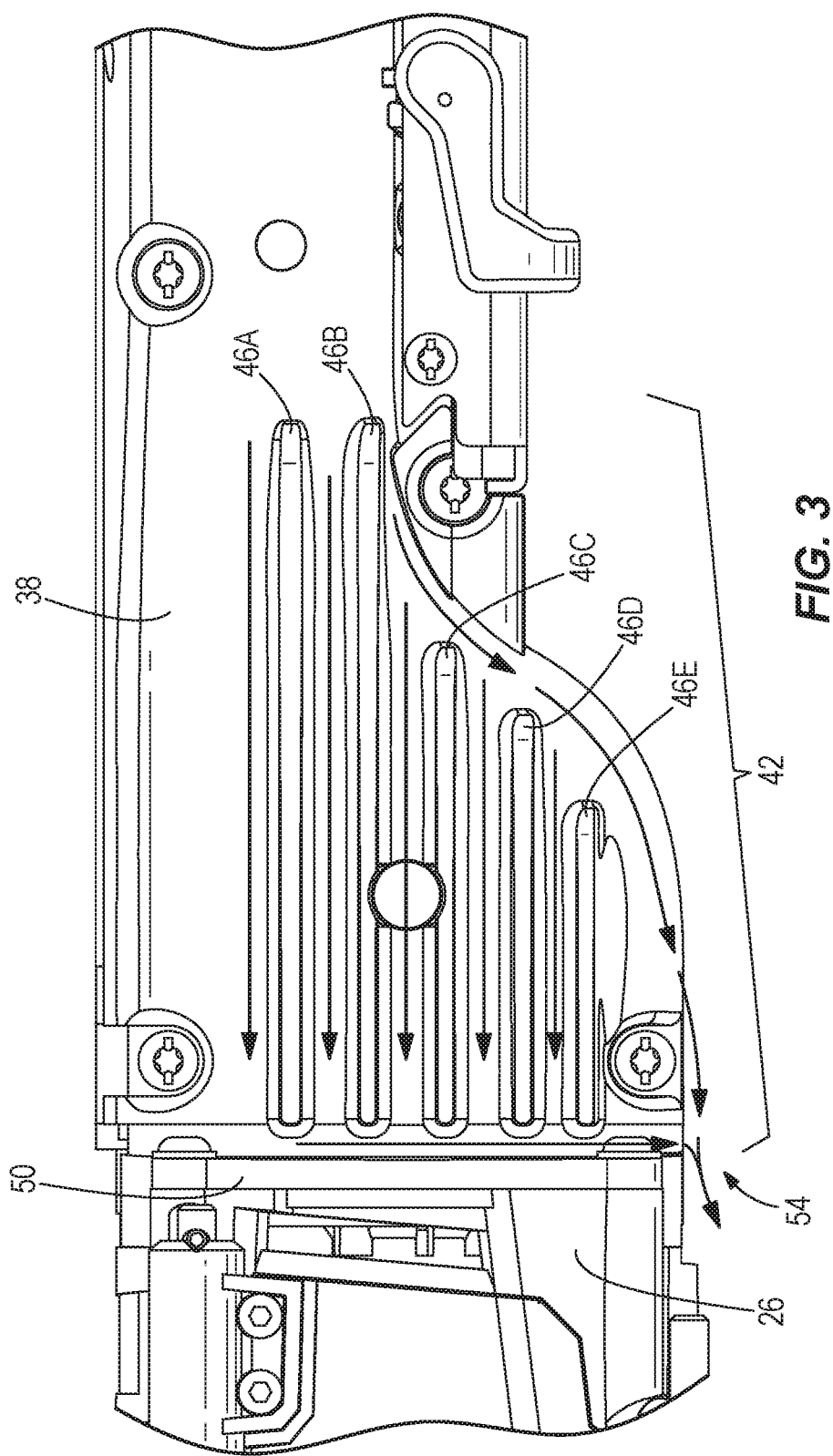

RECIPROCATING SAW

CROSS-REFERENCE TO RELATED APPLICATIONS

This application is a continuation of U.S. patent application Ser. No. 14/297,814, filed Jun. 6, 2014, now U.S. Pat. No. 10,124,430, which claims priority to U.S. Provisional Patent Application No. 61/831,945 filed on Jun. 6, 2013, the entire contents of each of which are incorporated herein by reference.

FIELD OF THE INVENTION

The present invention relates to power tools, and more specifically, to a reciprocating saw.

BACKGROUND OF THE INVENTION

Traditional reciprocating saws are at risk of foreign material entering and collecting within a housing of the reciprocating saw. Use of a reciprocating saw in certain applications may cause higher risk of foreign material entering a housing of the reciprocating saw. For example, a user may operate a reciprocating saw to cut an overhead plumbing pipe containing water, in which case the saw is at risk of water entering the saw. Water entering the reciprocating saw housing collects within the reciprocating saw causing damage to the tool.

SUMMARY OF THE INVENTION

In one embodiment, the invention provides a reciprocating saw including an outer housing defining a longitudinal axis, a casing positioned within the outer housing, an upstream opening between the outer housing and the casing, a downstream opening, and an egress path extending between the upstream opening and the downstream opening. The egress path includes an upstream portion that extends along the longitudinal axis, a downstream portion that extends in a direction transverse to the longitudinal axis, and a redirecting surface positioned between the upstream portion and the downstream portion.

In another embodiment, the invention provides a reciprocating saw including a motor and a blade driven by the motor to reciprocate along a longitudinal axis during a cutting operation. The reciprocating saw includes a motor casing, a gear casing coupled to the motor casing, an outer housing surrounding the gear casing, an egress path defined between the outer housing and the gear casing, and an end plate disposed between the gear casing and the motor casing such that the end plate inhibits fluid flow between the egress path and the motor casing during the cutting operation.

In another embodiment, the invention provides a reciprocating saw including a motor and a blade driven by the motor to reciprocate along a longitudinal axis during a cutting operation. The reciprocating saw includes a motor casing, a gear casing coupled to the motor casing, an outer housing surrounding the gear casing, an egress path defined between the outer housing and the gear casing, and a window in a bottom side of the outer housing. The blade extends from a blade end of the outer housing, and the egress path extends from an upstream opening adjacent the blade end to the window. During the cutting operation, the egress path is configured to direct liquid that enters the upstream opening toward a redirecting surface that redirects the liquid toward the window.

Other aspects of the invention will become apparent by consideration of the detailed description and accompanying drawings.

BRIEF DESCRIPTION OF THE DRAWINGS

FIG. 1A is a side view of a reciprocating saw with an outer housing according to one embodiment of the invention.

FIG. 1B is another side view of the reciprocating saw of FIG. 1A with the outer housing removed.

FIG. 2A is a bottom view of the reciprocating saw of FIG. 1A.

FIG. 2B is another bottom view of the reciprocating saw of FIG. 1A with the outer housing removed.

FIG. 3 is an enlarged side view of the reciprocating saw of FIG. 1A with the outer housing removed.

Figure 4:
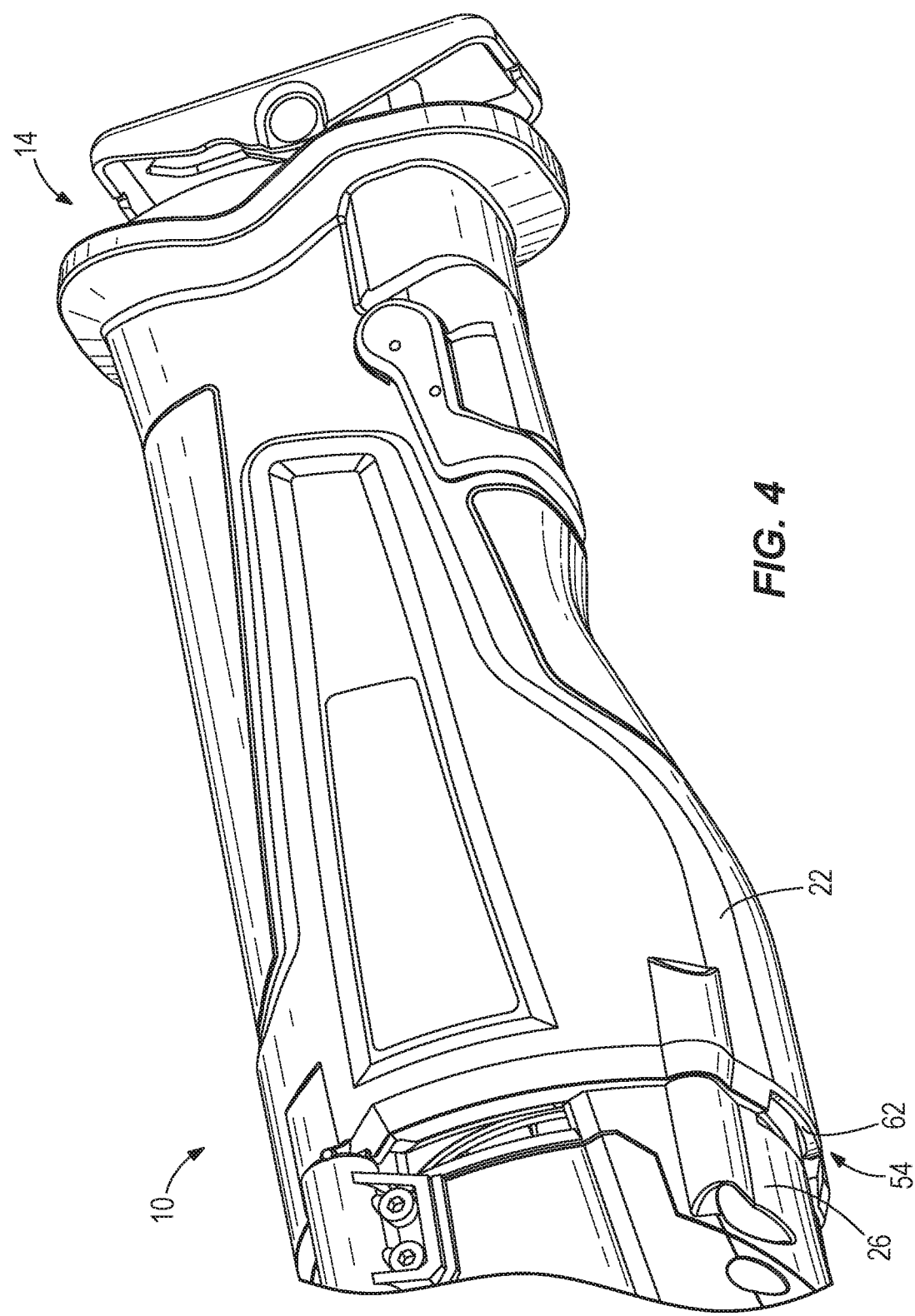
FIG. 4 is a bottom perspective view of the reciprocating saw of FIG. 1A.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

FIG. 1A illustrates a reciprocating saw 10 including a saw blade (not shown) inserted in a blade end 14 of the reciprocating saw 10, where the blade is supported for translation along a longitudinal axis 18. The reciprocating saw 10 includes an outer housing 22 coupled to a motor casing 26 enclosing a motor (not shown) of the reciprocating saw 10. The motor may be a brushless or brushed DC motor powered by a DC power source, such as a battery (not shown). Alternatively, the motor may be an AC motor powered by a remote AC power source (e.g., a wall outlet) using a power cord. Extending from the motor casing 26 is a handle portion 30, which includes a trigger 34 to allow a user to activate the reciprocating saw 10.

The outer housing 22 partially surrounds a gear casing 38 clearly shown in FIG. 1B with the outer housing 22 removed. The gear casing 38 is also coupled to the motor casing 26 and encloses a rotary to linear power converter (not shown) to transfer the rotation of the motor to translation of the saw blade. The gear casing 38 is positioned within the outer housing 22, and there exists spacing at the blade end 14 of the reciprocating tool 10 between the outer housing 22 and the gear casing 38 where foreign material (e.g., a liquid) can enter. For example, a liquid such as water could enter the reciprocating saw 10 at the blade end 14 between the gear casing 38 and the outer housing 22 when cutting an overhead plumbing pipe containing water. As described in detail below, the reciprocating saw 10 includes an egress (i.e., exit) path 42 (FIG. 3) for the foreign material entering between the gear casing 38 and the outer housing 22.

With reference to FIG. 1B, the egress path 42 partially consists of ribs 46A-46E extending out from a side of the gear casing 38. The ribs 46A-46E extend substantially parallel to the longitudinal axis 18, and are spaced apart from each other. The ribs 46A-46E extend different lengths along the gear casing 38, with ribs 46A and 46B extending the longest distance and the rib 46E extending the shortest distance. The ribs 46A-46E are spaced apart from an end plate 50 formed in the gear casing 38 that is used to couple the gear casing 38 to the motor casing 26. In other words, foreign material is allowed to flow or move around the ribs 46A-46E and is not trapped between the ribs 46A-46E and the end plate 50. In the illustrated embodiment, the ribs 46A-46E extend outwardly from an outer surface of the gear casing 38. In alternative embodiments, the ribs 46A-46E may extend inwardly from an inner surface of the outer housing 22. In further alternatives, the ribs 46A-46E may include a combination of ribs extending outwardly from an outer surface of the gear casing 38 and ribs extending inwardly from an inner surface of the outer housing 22.

With reference to FIGS. 2A and 4, the egress path 42 further includes a window 54 (i.e., aperture) through which the foreign material exits the reciprocating tool 10. In the illustrated embodiment, the window 54 (FIG. 4) is formed partially in the motor casing 26 and partially in the outer housing 22, and the window is partially bounded by the end plate 50 of the gear casing 38. However, in alternative embodiments, the window 54 may be formed completely in the motor casing 26 or completely in the outer housing 22. In addition, the window may be bounded by either the motor casing 26 or the gear casing 38. In further alternatives, the gear casing 28 may include a projection to abut and plastically deform the outer housing 22, so that when the outer housing 22 is installed over the gear casing 28 a window is created via the plastic deformation of the outer housing 22. With reference to FIG. 2B, the outer housing 22 is removed to illustrate again the spacing between the end plate 50 and the ribs 46A-46E.

With reference to FIG. 3, the egress path 42 is illustrated with arrows indicating the travel of a liquid foreign material. If the reciprocating saw 10 was being used in an overhead cut (i.e., with the blade end 14 tilted upward with respect to horizontal) and liquid entered between the gear casing 26 and the outer housing 22, the liquid would flow along the ribs 46A-46E toward the end plate 50 where the water would then be redirected toward the window 54, thereby exiting the reciprocating saw 10.

Figure 5:
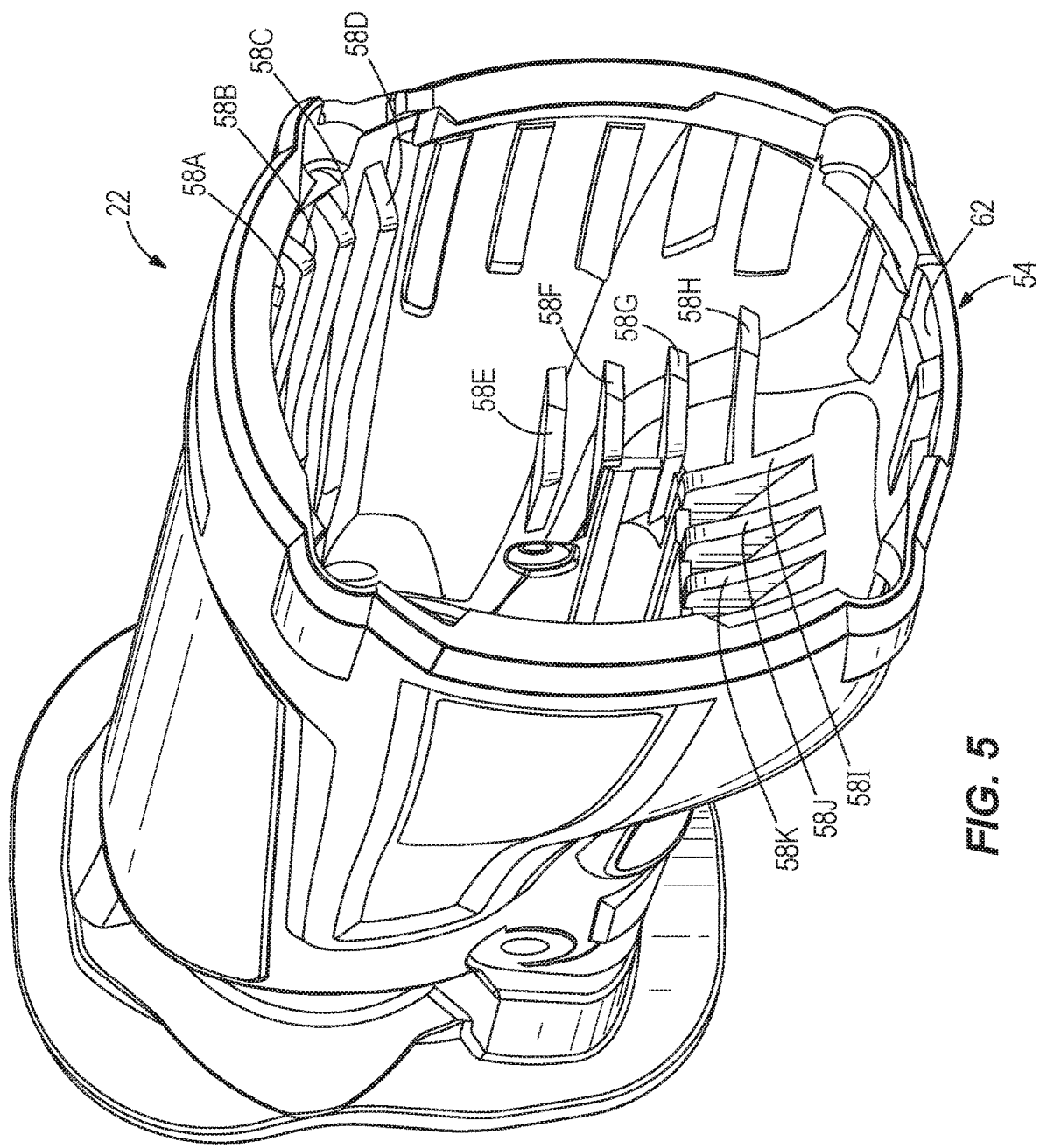
FIG. 5 is a rear perspective view of the outer housing of FIG. 1A.

Referring to FIG. 5, the outer housing 22 is illustrated removed from the remaining portions of the reciprocating tool 10. Internal to the outer housing 22, a plurality of inwardly extending ribs 58A-58K form a portion of the egress path 42. Similar to the ribs 46A-46E formed on the gear casing 38, the ribs 58A-58K direct the flow or movement of the foreign material in the reciprocating tool 10 toward the window 54. Proximal to the window 54, a recess, or landing, 62 is formed in the outer housing 22 to collect any foreign material about to be expelled through the window 54.

Figure 6:
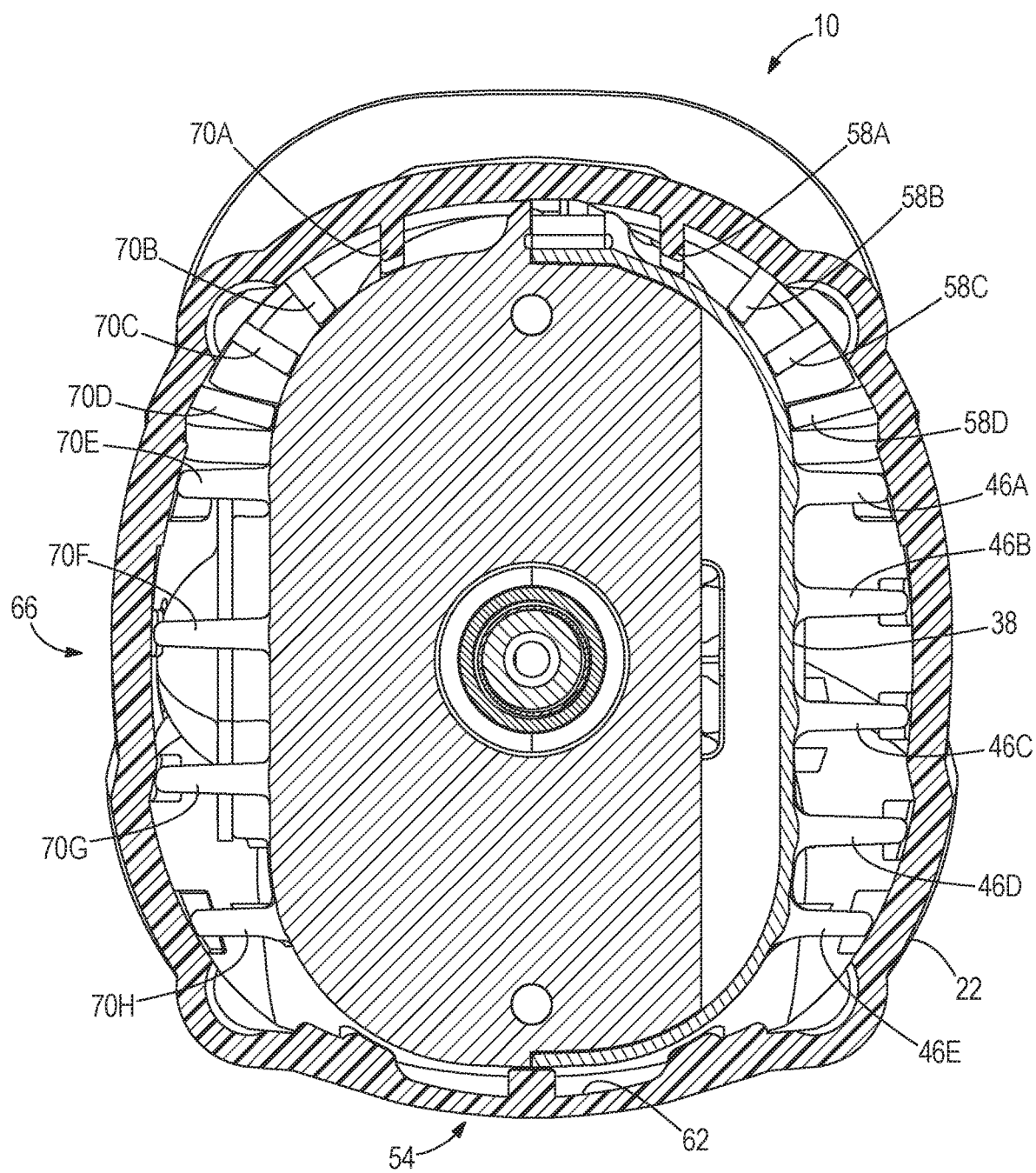
FIG. 6 is a cross-sectional view of the reciprocating saw of FIG. 1A taken along section 6-6.

With reference to FIG. 6, a cross-sectional view illustrates the gear casing 38 and outer housing 22 coupled together with ribs 46A-46E and 58A-58K extending in the spaced between the gear casing 28 and the outer housing 22, forming the egress path 42 therebetween. Also illustrated by FIG. 6 is an opposite side 66 of the reciprocating tool 10 with a similar, but not identical, arrangement of ribs 70A-70H extending from either the outer housing 22 or the gear casing 38 to form the egress path 42 on the side 66 of the reciprocating tool 10.

Additional rib orientations and geometries not detailed here are considered within the scope of the invention. For example, the ribs can be formed on both the gear casing 28 and the outer housing 22, or the ribs can be formed entirely on either one of the gear casing 28 or the outer housing 22. In addition, any number of ribs can be utilized on either the gear casing 38 or the outer housing 22 to create an egress path. In addition to forming the egress path 42, the ribs 46A-46E and 58A-58K discussed above exhibit additional functionality, including improved heat transfer, structural strength enhancement, and ease of alignment for manufacturability.

Although the invention has been described with reference to certain preferred embodiments, variations and modifications exist within the scope and spirit of one or more independent aspects of the invention as described. Various features and advantages of the invention are set forth in the following claims.

What is claimed is:

1. A reciprocating saw comprising:
a motor;
an outer housing defining a longitudinal axis;
a blade driven by the motor to reciprocate during a cutting operation, the blade extending from the outer housing at a blade end of the outer housing;
a gear casing positioned within the outer housing; a motor casing and an end plate coupling the gear casing to the motor casing, wherein the end plate includes a redirecting surface;
an upstream opening between the outer housing and the gear casing;
a downstream opening; and
an egress path extending between the upstream opening and the downstream opening,
wherein the egress path includes an upstream portion that extends along the longitudinal axis, a downstream portion that extends in a direction transverse to the longitudinal axis, and the redirecting surface positioned between the upstream portion and the downstream portion,
wherein the redirecting surface is configured to redirect fluid flowing along the egress path from the upstream opening toward the downstream opening during the cutting operation.

2. The reciprocating saw of claim 1, wherein the upstream opening is located adjacent the blade end.

3. The reciprocating saw of claim 1, wherein the end plate inhibits fluid flow from the egress path into the motor casing.

4. The reciprocating saw of claim 3, wherein the egress path is defined between the gear casing and the outer housing.

5. The reciprocating saw of claim 1, wherein the downstream opening is partially defined by the motor casing and partially defined by the outer housing.

6. The reciprocating saw of claim 5, wherein the downstream opening is bounded by the redirecting surface.

7. A reciprocating saw including a motor and a blade driven by the motor to reciprocate along a longitudinal axis during a cutting operation, the reciprocating saw comprising:
a motor casing;
a gear casing coupled to the motor casing;
an outer housing surrounding the gear casing;
an egress path defined between the outer housing and the gear casing; and
an end plate disposed between the gear casing and the motor casing such that the end plate inhibits fluid flow between the egress path and the motor casing during the cutting operation,
wherein the egress path extends from an upstream opening to a window located adjacent the end plate, and wherein, during the cutting operation, the egress path is configured to direct liquid that enters the upstream opening toward the end plate, where the liquid is then redirected toward the window.

8. The reciprocating saw of claim 7, wherein the blade extends from the outer housing at a blade end of the outer housing, and wherein the upstream opening is located adjacent the blade end of the outer housing.

9. The reciprocating saw of claim 7, wherein the window is partially defined by the motor casing and partially defined by the outer housing.

10. The reciprocating saw of claim 7, further comprising a first plurality of ribs extending outward from the gear casing and a second plurality of ribs extending inward from the outer housing, wherein the first plurality of ribs and the second plurality of ribs are configured to guide fluid along the egress path from the upstream opening toward the end plate during the cutting operation.

11. The reciprocating saw of claim 10, wherein each of the first plurality of ribs and each of the second plurality of ribs is spaced from the end plate.

12. The reciprocating saw of claim 9, wherein the window extends through a bottom side of the outer housing.

13. A reciprocating saw including a motor and a blade driven by the motor to reciprocate along a longitudinal axis during a cutting operation, the reciprocating saw comprising:
 a motor casing;
 a gear casing coupled to the motor casing;
 an outer housing surrounding the gear casing;
 an egress path defined between the outer housing and the gear casing; and
 a window in a bottom side of the outer housing,
 wherein the blade extends from a blade end of the outer housing,
 wherein the egress path extends from an upstream opening adjacent the blade end to the window, and
 wherein, during the cutting operation, the egress path is configured to direct liquid that enters the upstream opening toward a redirecting surface that redirects the liquid toward the window.

14. The reciprocating saw of claim 13, further comprising a first plurality of ribs extending outward from the gear casing and a second plurality of ribs extending inward from the outer housing, wherein the first plurality of ribs and the second plurality of ribs are configured to guide the liquid along the egress path from the upstream opening toward the end plate during the cutting operation.

15. The reciprocating saw of claim 14, wherein each of the first plurality of ribs and each of the second plurality of ribs is spaced from the redirecting surface.

16. The reciprocating saw of claim 13, wherein the redirecting surface is configured to redirect the liquid in a direction transverse to the longitudinal axis.

17. The reciprocating saw of claim 13, further comprising an end plate disposed between the gear casing and the motor casing, the end plate including the redirecting surface, wherein the end plate is configured to inhibit the liquid from entering the motor casing.

* * * * *